United States Patent [19]
Tsujihara et al.

[11] Patent Number: 5,216,497
[45] Date of Patent: Jun. 1, 1993

[54] DIGITAL CONVERGENCE APPARATUS INCLUDING AN EXTRAPOLATING CIRCUIT

[75] Inventors: Susumu Tsujihara, Neyagawa; Yasuaki Sakanishi, Ibaraki, both of Japan

[73] Assignee: Matsushita Electric Industrial Co., Ltd., Osaka, Japan

[21] Appl. No.: 587,802

[22] Filed: Sep. 25, 1990

[30] Foreign Application Priority Data

Sep. 28, 1989 [JP] Japan ................................ 1-253314
Oct. 12, 1989 [JP] Japan ................................ 1-266905

[51] Int. Cl.⁵ .................................................. H04N 9/28
[52] U.S. Cl. ..................................... 358/65; 358/60; 315/368.13
[58] Field of Search ........................ 358/65, 60, 10; 315/368.13

[56] References Cited

U.S. PATENT DOCUMENTS 4,672,275  6/1987  Ando ........................... 315/368.12
4,673,847  6/1987  Louie et al. ..................... 358/65
4,680,510  7/1987  Spieth et al. ................. 315/368.12
4,871,948  10/1989 Nelson ......................... 315/368.13
5,111,284  5/1992  Tsujihara et al. ................ 358/60

FOREIGN PATENT DOCUMENTS 60-130288  7/1985  Japan .
62-11388   1/1987  Japan .
1-26234    5/1989  Japan .

Primary Examiner—Edward L. Coles, Sr.
Assistant Examiner—Kim Yen Vu
Attorney, Agent, or Firm—Wenderoth, Lind & Ponack

[57] ABSTRACT

A digital convergence apparatus detects the presence/absence, frequency and the number of scanning lines of inputted synchronizing signals, performs an interpolation between adjusting points corresponding to the detection signal to prepare a correction data, and performs a cursor display of a center position between adjusting points, extrapolating operation control and difference data storage, writing of the same data into n-planes, and time sharing of the interpolation processor so as to accommodate multimedia with a high accuracy.

5 Claims, 16 Drawing Sheets

|  | DURING NORMAL SIGNAL PERIOD | DURING NON-SIGNAL PERIOD |
|---|---|---|
| CONTROL PANEL | OPERATIVE | INOPERATIVE |
| NUMBER OF SCANNING LINES/FREQUENCY DETECTOR | AUTOMATIC FOLLOWING | SPECIFIC MODE SETTING |

○ : ADJUSTING POINT WITHIN THE SCREEN

⊘ : ADJUSTING POINT OUTSIDE THE SCREEN (EXTRAPOLATING POINT)

DISPLAY SCREEN VIEW

40 THROUGH 45 : FRAME MEMORIES

DIGITAL CONVERGENCE APPARATUS INCLUDING AN EXTRAPOLATING CIRCUIT

BACKGROUND OF THE INVENTION

1. Field of the Invention

The present invention relates to a apparatus for correcting the convergence of color television receivers, and more particularly to a digital convergence apparatus which is capable of accommodating various signal sources with a stable operation.

2. Description of Prior Art

Generally, in a projection color receiver for projecting an enlargement of a picture on its screen three projection picture tubes emitting primary colors, the incident angle of the projection picture tubes to the screen varies with each tube, resulting in a color drift on the screen. Superposition of primary colors, or "convergence", has been adjusted in such a manner that it is allowed to synchronize with the horizontal and vertical scanning cycles to provide analogically a convergence correction waveform which in turn is allowed to be changed in size and shape. However, such method has a problem with respect to convergence accuracy. Accordingly, a digital convergence apparatus disclosed in Japanese Laid-open Patent Publication No. 60-130288/1985 has been proposed which can accommodate various signals and has a high convergence accuracy. Another apparatus disclosed in Japanese Patent Publication No. 1-26234/1989 has been proposed which determines the correction data of adjusting points outside the screen by an extrapolating operation.

Such prior art digital convergence apparatus will be explained hereinafter. FIG. 21 is a block diagram showing a prior art digital convergence apparatus which projects a pattern for convergence correction such as a crosshatch pattern (shown in FIG. 22) on a screen, writes digitally the data of convergence correction quantity for each adjusting point into a frame memory, and reads and D/A converts the data to perform convergence correction.

In FIG. 21, the element 9 is a crosshatch generator; element 13 is a video image circuit; element 50 is a read address controller; element 80 is a write address controller; element 1 is a control panel; element 110 is a reversible counter; element 90 is a multiplexer; element 6 is a one-frame memory; element 180 is a register; element 10 is a vertical interpolator; element 11 is a D/A conversion circuit; element 12 is an LPF; element 260 is a number of scanning lines detector; element 270 is a number between adjusting points setter; element 280 is a coefficient operator; element 14 is an output amplifier, and element 8 is a deflection circuit/high-voltage circuit. A horizontal/vertical cycle pulse synchronizing with a deflecting current cycle is added as a synchronizing signal to the read address controller 50, whereby the controller is driven. Utilizing the pulse from the read address controller 50, the crosshatch generator 9 is driven to project a crosshatch pattern on a projection screen. On the other hand, with the address key on the control panel 1, a cross point (for example, A in FIG. 22) of a position required for convergence correction is specified to set the position address to the write address controller 80. Then, with the data write key on the control panel 1 of a color you want to correct, for example, the colored, while seeing the screen, a correction quantity is written through the data reversible counter 110 into the one-frame memory 6. The writing into the one-frame memory 6 is generally changeover controlled by the multiplexer 90 so as to be performed during the blanking period of the video signal. Accordingly, no read is impaired.

Thus, similar operations at each adjusting point are performed. Then, the one-frame memory 6 is read by the read address controller 50 for each adjusting point on the screen, and the correction quantity in the vertical scanning direction between adjusting points is processed by the vertical interpolator 10 through the register 180 driven by the read address controller 50. In order to accommodate various signal sources, it is necessary to perform the processing between adjusting points corresponding to each number of scanning lines. Accordingly, an input synchronizing signal is supplied to the number of scanning lines detector 260 where the number of scanning lines of one field is detected and added to the number between adjusting points setter 270. In the number between adjusting points setter 270, the number of scanning lines N, $N=M/(L+1)$, of the number between adjusting points is determined from the number of scanning lines M of one field and the number of adjusting points L in the vertical direction, and added to the coefficient operator 280. The number is also added to the write address controller 80 and the read address controller 50 change over to the operation for each N lines. The output from the vertical interpolator 10 operating a above is converted by the D/A conversion circuit 11 to a signal with an analog quantity. A signal between adjusting points in the horizontal direction is smoothed for the correction quantity of the adjusting point at each row by using of the low pass filter (LPF) 12, amplified by the output amplifier 14, and then supplied to a convergence yoke 17. Also, a detection signal from the number of scanning lines detector 260 is added as a system changeover signal to the deflection circuit/high-voltage circuit 8 to change over the deflecting amplitude or frequency.

As described above, the prior art apparatus independently performs the correction for each adjusting point for various signal sources, so that it can perform convergence correction with a better accuracy.

However, the digital convergence apparatus having such an arrangement as described above can perform adjustment with a good accuracy for various signal sources during convergence adjustment, whereas it has a problem that it performs erroneous operation during non-signal period, or a receiver is damaged because of abnormal system changeover such as deflection. It also has a problem in that correction data input operation is required for various signals, resulting in a longer adjustment time It further has a problem in that it cannot accommodate a signal source having a high horizontal scanning frequency because of a slow operation speed of the number between adjusting points setter.

It also has a problem in that the position of each adjusting point is hardly confirmed because the cursor display is dot blinking, and in that, because the cursor is displayed at the position of the extrapolating point outside the screen, the cursor display of the extrapolating point cannot be seen to make adjustments impossible when the deflecting amplitude of a projection television receiver is over scanned. It further has a problem that the correction data of the extrapolating point is determined by the correction data from the adjusting points within the screen, so that the extrapolating points must be adjusted finally, whereby the current amplifying step to drive the convergence yoke requires an amplifier with a wide band. Such a current amplifying step necessitates a greater power consumption.

SUMMARY OF THE INVENTION

In order to solve the above problems, an object of the present invention is to provide a digital convergence apparatus which detects a non-signal period from synchronizing signals, stops the operation of digital convergence during a non-signal period, sets to a specific setting mode to operate a receiver, writes the same correction data to an n-piece memory means, performs processing between vertical adjusting points using two pieces of memories to accommodate various signal sources with a stable operation, displays the cursor of the adjusting point outside the screen at the position of the adjusting point within the screen determined by an extrapolating operation, and makes the cursor position plainly visible and extrapolating operation operable with a high accuracy by a storing method of the correction data and the difference data of a memory.

In order to achieve the above object, a digital convergence apparatus according to the present invention includes a means for detecting the presence/absence, the frequency and the number of scanning lines of synchronizing signals inputted into a receiver, and a means for performing interpolation between adjusting points corresponding to said detection signal to prepare correction data.

Also, an in the present invention, extrapolating operation means includes a means for determining through operation the correction data of two adjusting points adjacent to each other in each correcting direction.

Also, a in the present invention, cursor display means includes a means for displaying the cursor at the screen position corresponding to near the center between peripheral adjusting points adjacent to each other based on each adjusting point.

Further, a in the present invention, correction data preparation means includes a means for controlling the interpolation in the vertical direction by the number of scanning lines and the interpolation in the horizontal direction by frequency, and for stopping the correcting operation during a non-signal period and setting a receiver to a specific operation mode to prepare correction data.

Further, in the present invention, the apparatus includes a means for displaying the cursor display area at the screen position corresponding to the correction quantity from the maximum to the minimum values of the number of quantized bits of said memory means based on each adjusting point.

Further, a in the present invention, cursor display area means includes a means for controlling cursor display area corresponding to the correction area converted into an analog quantity.

Further, in the present invention, the apparatus includes a means for detecting the correction data of the memory means, and a means for determining through an extrapolating operation the correction data of each adjusting point outside the screen from the correction data within the screen when the correction data is not written into said memory means, and for controlling said extrapolating operation so as to be not performed when the correction data is written into said memory means.

Further, in the present invention, the apparatus includes a means for determining through an extrapolating operation the correction data of each adjusting point outside the screen from the correction data within the screen, a means for allowing the correction data of the adjusting points outside the screen of said memory means to store the difference data to the operation data determined by the extrapolating operation, and a means for determining the correction data of each adjusting point outside the screen by use of the operation data determined by said extrapolating operation and said difference data.

Further, in the present invention, the apparatus includes an n-piece memory means for storing digitally the convergence correction quantity for an adjusting point, a means for detecting the frequency and the number of scanning lines of the synchronizing signals inputted into said receiver, a means for preparing the correction data corresponding to said detection signals, and a means for writing the same correction data into said n-piece memory means.

Still further, in the present invention, the apparatus includes a means for performing the interpolation between the adjusting points in the vertical direction, and a means for preparing the correction data between adjusting points by use of a first memory for allowing said interpolation means to store the correction data of a first adjusting point and a second memory for allowing the same to store the correction data of a second adjusting point.

According to the present invention, the writing of erroneous correction data is prevented by detecting non-signal period and stopping convergence operation using the detection signal, thereby allowing a stable operation. Also, where detection signals are used for system changeover of a receiver, the receiver is forcedly set to a specific operation mode without developing abnormal operation during a non-signal period, so that the receiver can always perform a stable operation. Further, the correction data corresponding to the frequency and the number of scanning lines of synchronizing signals is prepared, so that various signal sources can be accommodated.

Also, the according to the present invention, extrapolating operation method is determined through operation from the correction data of two adjusting points adjacent to each other in a correcting direction, so that the input of the correction data of extrapolating points is unnecessary, allowing the adjustment of extrapolating points to be eliminated and the adjusting time to be shortened.

The processing of the interpolation between adjusting points in the vertical direction by the detection signals of the number of scanning lines, and the control of address and LFP by the detection signals of horizontal scanning frequency allows the apparatus according to the present invention to accommodate various signal sources, leading to an expanded application range.

By displaying the cursor of the adjusting points outside the screen at the position of the adjusting points within the screen determined by extrapolating operation, the cursor is displayed at the two adjusting points within the screen determined by extrapolating operation even when the deflecting amplitude of a receiver is over scanned to cause the adjusting points outside the screen not to be displayed, so that the extrapolating point adjustment mode can be recognized at a glance, resulting in a shorter adjusting time.

Also, by displaying the area of cursor display at the screen position corresponding to the correction quantity from the maximum to the minimum value of the number of quantized bits of a memory based on each adjusting point, the present invention allows the correction range being a dynamic range to be displayed on the screen, and the method of a cursor display with square or circle mark based on adjusting points is possible, so that the cursor position can be recognized at a glance, resulting in a shorter adjusting time. Also, the convergence accuracy between adjusting points can be confirmed by the cursor display with a square or circle mark, making possible the correction with a high accuracy.

Further, the present invention allows the correction data from the maximum to the minimum values to be detected in the step of the analog correction quantity D/A converted, making possible the data detection with a simple arrangement.

Further, by detecting the correction data of the memory means to control the presence/absence of extrapolating operation, the present invention allows the convergence correction with a fewer number of adjustments. Also, by performing the extrapolating operation only during initial adjustment, the effect between adjusting points, in particular, near the extrapolating point is kept at a minimum, making possible the correction with a high accuracy.

Further, according to the present invention, by allowing the correction data of the extrapolating points outside the screen to store the difference data to the correction data determined by extrapolating operation, and by determining the correction of the extrapolating points by said extrapolating operation data and the difference data, the correction data correlating with each other can be prepared even when the data of the adjusting points within the screen determined by extrapolating operation is allowed to be changed, so that the readjustment of extrapolating point is not required, leading to a shorter adjusting time. Also, the correction data of extrapolating point having a large correction quantity is only the difference data, so that the reduction of the circuit size and the number of quantized bits of memory can be expected, whose practical effect is large.

Also, simultaneous writing of the same correction data into n-piece memory means requires only one input of the correction data into the n-piece memory means, that is, only one adjustment, so that the adjusting time can be shortened. Also, the fine adjustment requires less changes into quantity of the correction data, allowing the adjustment to be extensively shortened.

Further, when the interpolation between the adjusting points in the vertical direction is performed using two memories, by slowing operation rate through serial processing, the signal sources having a high horizontal scanning frequency can be accommodated, leading to an expanded accommodation range.

DESCRIPTION OF PREFERRED EMBODIMENTS

Figure 1:
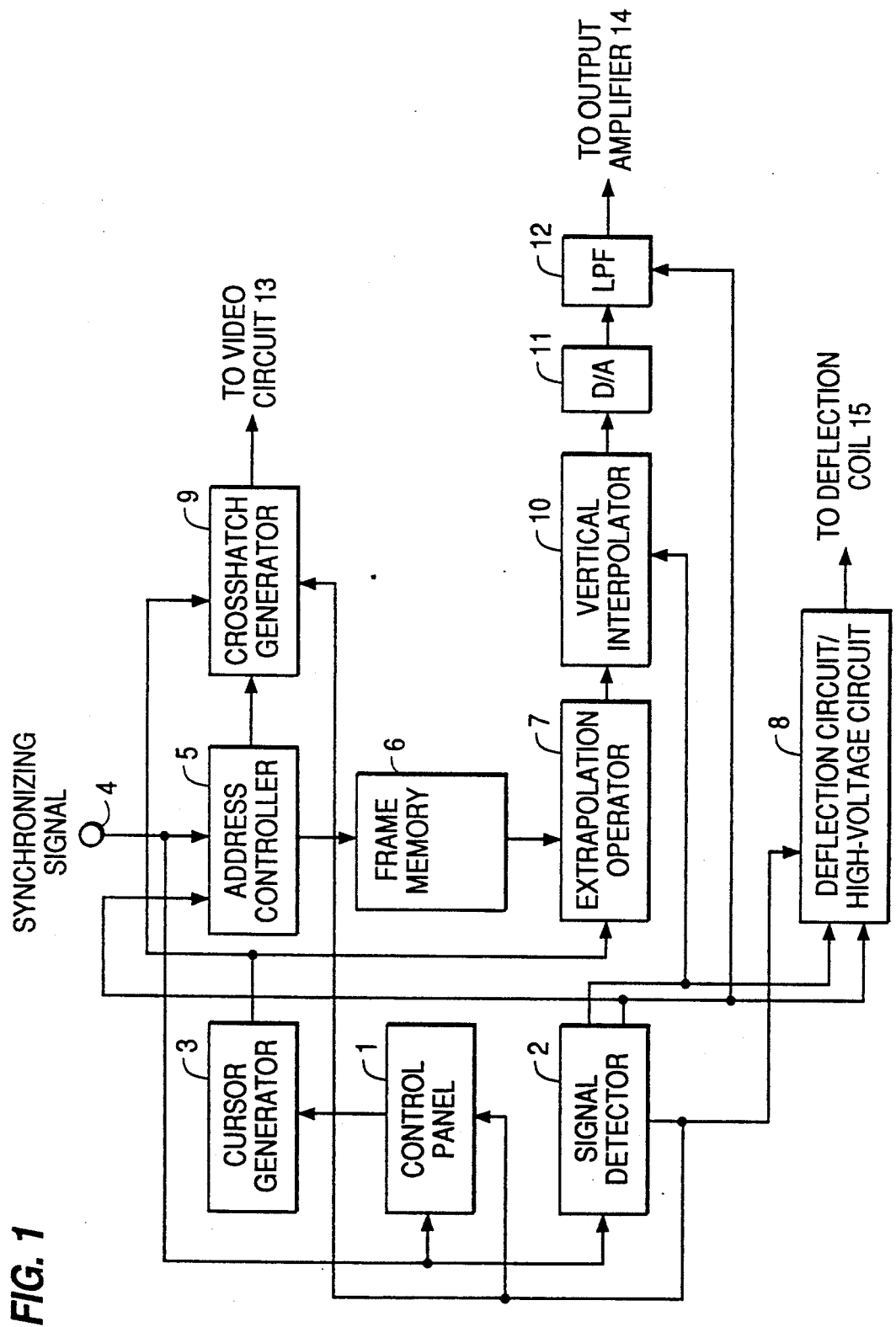
FIG. 1 is a block diagram of a digital convergence apparatus in accordance with one embodiment of the present invention.
Figure 2:
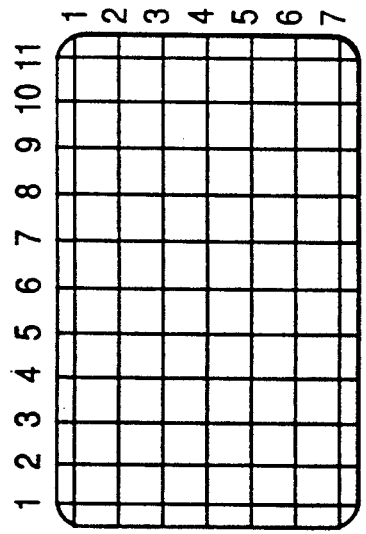
FIG. 2 is a display screen view to explain the operation of the embodiment of FIG. 1.
Figure 21:
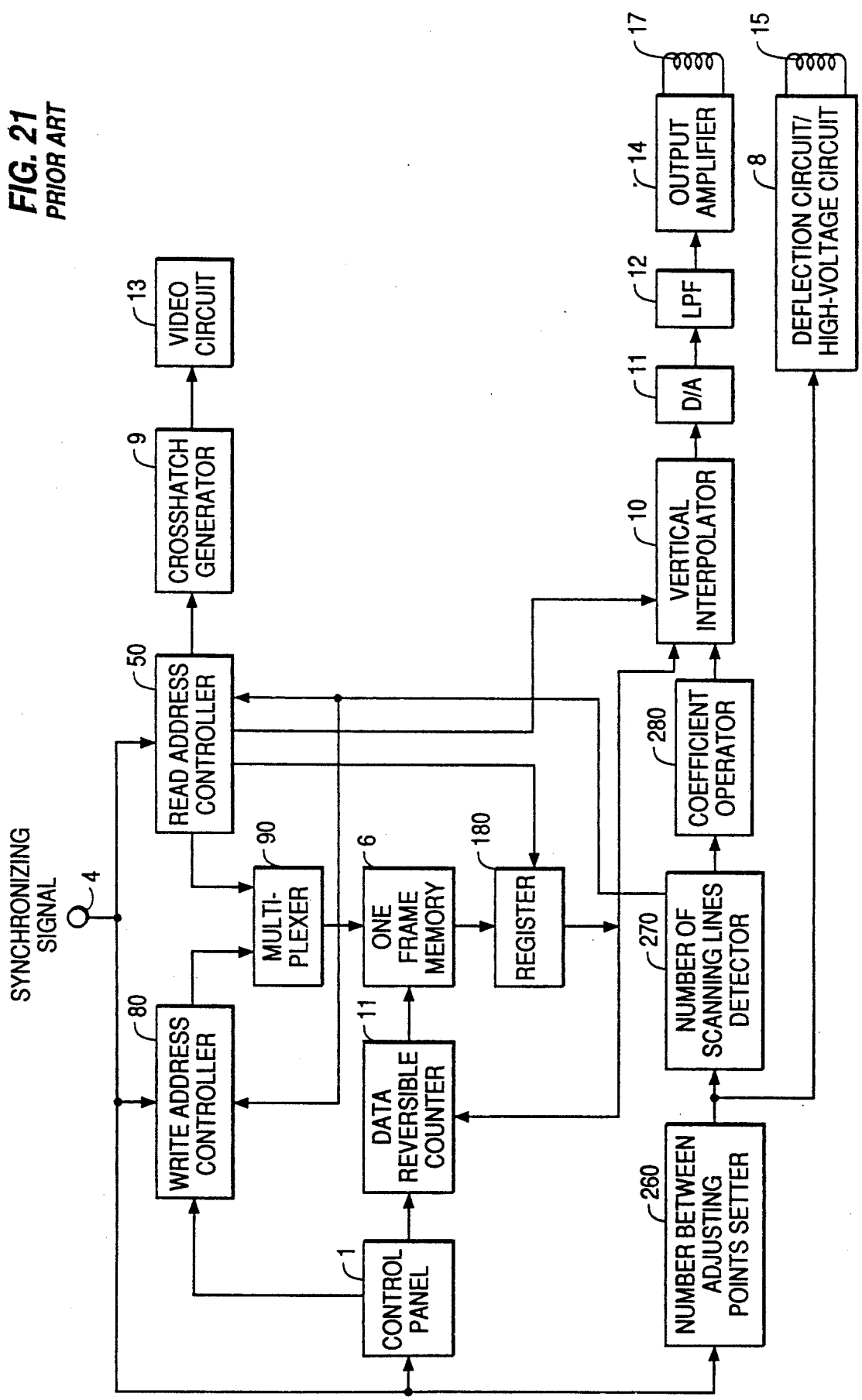
FIG. 21 is a block diagram of a prior art digital convergence apparatus.
Figure 22:
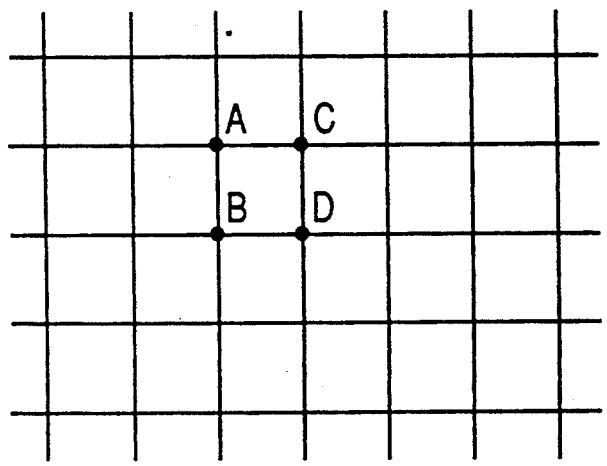
FIG. 22 is a display screen view to explain the operation of the apparatus of FIG. 21.

With reference to drawings, one embodiment according to the present invention will be explained hereinafter. FIG. 1 through FIG. 6 show the block diagram and display screen view of a digital convergence apparatus in accordance with a first embodiment of the present invention. In FIG. 1, element 5 is an address controller for controlling the writing and reading of a memory; element 2 is a signal detector for detecting the horizontal scanning frequency and the number of scanning lines, and the presence/absence of a signal using a synchronizing signal; element 7 is an extrapolation operator for determining the correction data of the adjusting points outside the screen from the adjusting point data within the screen; element 10 is a vertical interpolator for performing the interpolation with the number of the adjusting points in the vertical direction according to the number of scanning lines; element 12 is an LPF for controlling cut-off frequency according to the horizontal scanning frequency to smooth the correction data in the horizontal direction. FIG. 2 shows a display screen view indicating the positions of adjusting points, FIG. 3 a block diagram of each detector, and FIG. 4 an operational representation. Also, in FIG. 1, the components operating in a similar manner to those of the prior art apparatus in FIG. 21 are shown with the same reference numerals and an explanation thereof has been omitted.

The operation of the digital convergence apparatus of the present invention arranged as described above is explained hereinafter. An input terminal receives a synchronizing signal, and the address controller 5 generates various address signals to control a frame memory, and a crosshatch generator 9 generates, for example, a crosshatch pattern having eleven horizontal rows and nine vertical columns as shown in the display screen view of FIG. 2 to project it on a screen. Also, the synchronizing signal is supplied to the signal detector 2, which detects the number of scanning lines and frequency corresponding to each signal source, and the presence/absence of the signal. The detected signal from the signal detector 2 is supplied to the vertical interpolator 10, which sets the number of adjusting points so that the number of adjusting points in the vertical direction is always the same even for a signal source having a different number of scanning lines like the cross-hatch signal shown in FIG. 2, and prepares the correction data corresponding to each scanning line between adjusting points not having been stored in the frame memory 6. The output from the vertical interpolator 10 is converted into an analog quantity by a D/A conversion circuit 11, which prepares a correction waveform.

Similarly, also for the processing in the horizontal direction, in order to set the number of adjusting points so that the number in the horizontal direction is always the same even for a signal source having a different horizontal scanning frequency like the crosshatch signal shown in FIG. 2, the control as shown below is performed. The horizontal scanning frequency detection signal from the signal detector 2 is supplied to the address controller 5, which generates an address signal corresponding to each scanning frequency. Said detected signal is supplied to the LPF 12 for smoothing the correction data in the horizontal direction, which controls the cut-off frequency according to each scanning frequency to smooth the correction data corresponding to scanning frequency.

The operation of the signal detector will be explained hereinafter. The signal detector 2 detects the presence/absence of the synchronizing signal, and the detection signal together with the number of scanning lines detection signal and the horizontal scanning frequency detection signal are supplied to a control panel 1 and the crosshatch generator 9. During non-signal period, each detection signal is forcedly set to a specific mode such that the control panel 1 stops key entry operation and the crosshatch generator 9 stops the output of the hatch signal. Thus, each detection signal set in the signal detector 2 during non-signal period is supplied to a deflection circuit/high-voltage circuit 8, which controls its oscillation frequency and amplitude.

Figure 3:
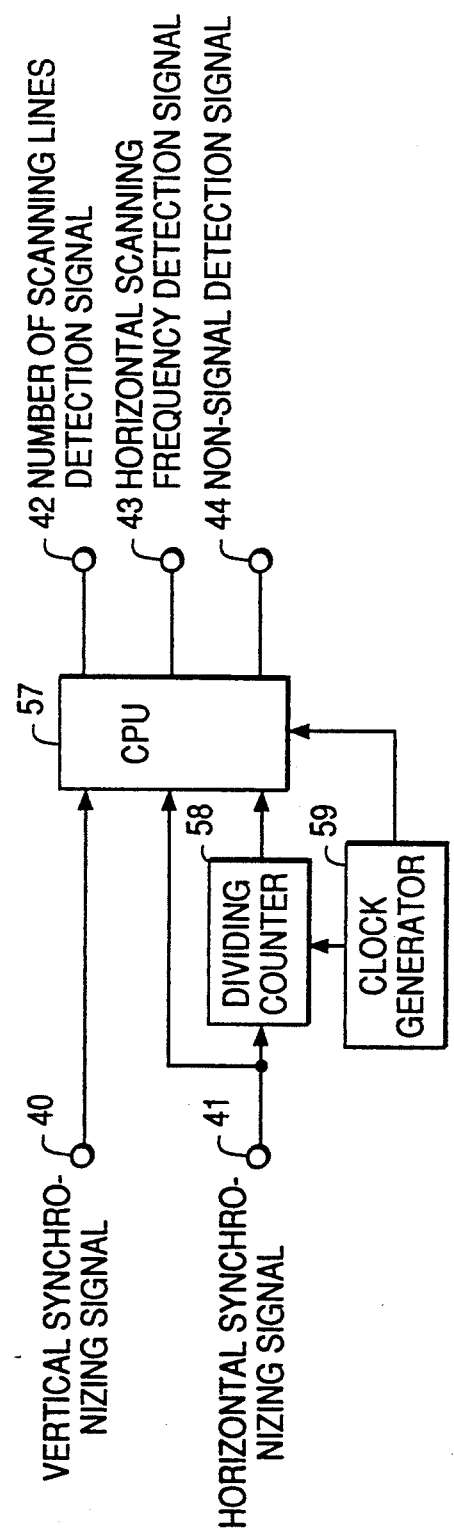
FIG. 3 is a block diagram of the signal detection means of the embodiment.
Figures 4, 5:
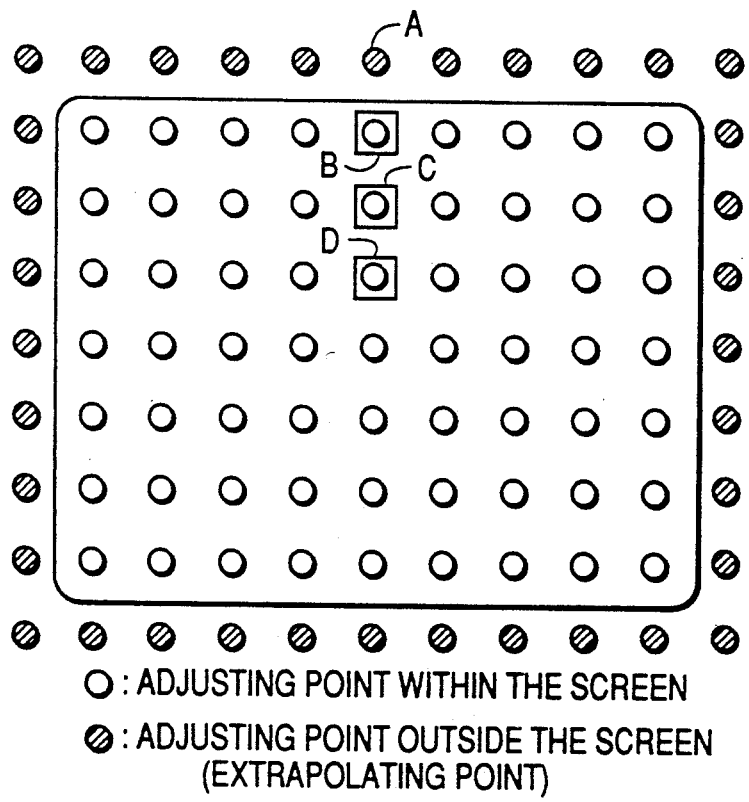
FIG. 4 is an operational representation of the embodiment.
FIG. 5 is a display screen view to explain the operation of extrapolating operation means of the embodiment of FIG. 1.

Using the block diagram of FIG. 3 and the operational representation of FIG. 4, each detector will be explained in detail hereinafter. A number of scanning lines detector 26, a horizontal scanning frequency detector 35 and a signal detector 36 are arranged by a CPU 57 as shown in FIG. 3. A vertical synchronizing signal is supplied to an input terminal 40, and a horizontal synchronizing signal to an input terminal 41. The horizontal synchronizing signal from the input terminal 41 is supplied to a dividing counter 58, and the dividing ratio to the clock signal from a clock generator 59 of the CPU is determined by the CPU 57 to obtain a horizontal scanning frequency detection signal at an output terminal 43. The vertical synchronizing signal from the input terminal 40 is directly supplied to the CPU 57, which determines how many times the horizontal synchronizing signal from the input terminal 41 occurs within the vertical synchronizing signal, that is, the number of scanning lines of one field to obtain a number of scanning lines detection signal at an output terminal 42. Then, for non-signal detection, when said number of scanning lines detection signal and horizontal scanning frequency are not present within a specific range, a non-signal detection signal is outputted from an output terminal 44. As shown in the operational representation of FIG. 4, by stopping the key operation of the control panel 12 and setting the specific mode of the scanning line/frequency detector, that detection signal controls the operation of a receiver with respect to convergence.

Using FIGS. 5 and 6, extrapolating operation will be explained in detail hereinafter. The crosshatch generator 9 generates, for example, a crosshatch pattern having eleven horizontal rows and nine vertical columns as shown in the display screen view of FIG. 5 to project it on a screen. Then, the adjusting points of the position required for correction and the color to be corrected are selected by the cursor key (not shown) on the control panel 1, and stored in the area of the frame memory 6 corresponding to their addresses. Also, adjustment is performed by storing the correction data of the adjusting points (white circle ○) within the screen of FIG. 5, and the correction data of the extrapolating points (black circle ●) of the adjusting points outside the screen is determined by the extrapolating operator from the correction data within the screen, for example, straight-line approximation.

Figure 6:
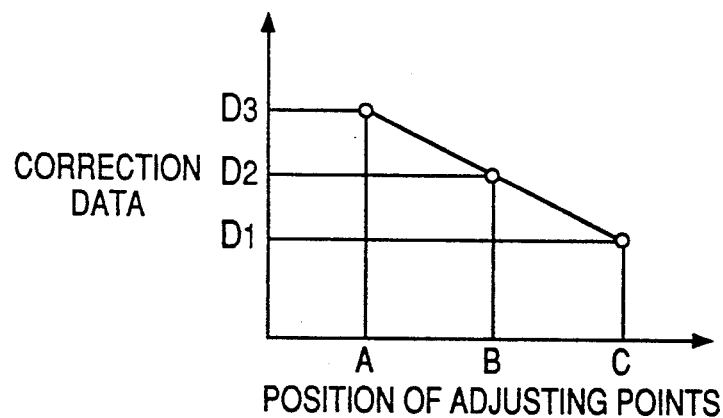
FIG. 6 is a correction data graph showing the extrapolating operation method of the embodiment.

FIG. 6 shows an operational graph indicating the operation of the extrapolating operator, in which the extrapolating point A is determined as the correction data D3 through straight-line approximation from the correction data D1 of the point C and the correction data D2 of the point B of the adjusting points within the screen. The extrapolating operation display is performed such that the cursor display at this time is not at the position of the extrapolating point A, but at the two points of the adjusting points B and C within the screen. The detection of the extrapolating point is performed such that the cursor address is detected from the control signal from the control panel 1, for example, by the CPU to signal-discriminate whether the signal is within or outside the screen, and the discrimination signal is supplied through a cursor generator 3 to the crosshatch generator 9 and the extrapolation operator 7 to perform extrapolating point display and operation. Accordingly, as shown in the display screen view of FIG. 5, for example, square cursors are displayed at the adjusting points B and C, and for the adjusting point D within the screen, a square cursor is displayed only at the D position. That is, when only one cursor is displayed, that cursor position indicates the position of the adjusting point within the screen, while when two cursors are displayed, the cursor positions indicate the position of the adjusting point outside the screen (extrapolating point).

According to the present embodiment as described above, by detecting a non-signal period and using the detection signal to stop convergence operation, the writing of erroneous correction data is prevented, allowing a stable operation. Also, where the detection signal and the like are used for the system changeover of a receiver, the receiver is forcedly set to a specific operation mode without developing abnormal operation during non-signal period, so that the receiver can always perform a stable operation. Further, the correction data corresponding to the frequency and the number of scanning lines of synchronizing signals is prepared, so that various signal sources can be accommodated.

Also, by displaying the cursors for the adjusting points outside the screen at the positions of the adjusting points within the screen determined by extrapolating operation, the cursors are displayed at the two adjusting points within the screen determined by extrapolating operation even when the deflecting amplitude of a receiver is over scanned to cause the adjusting points outside the screen not to be displayed, so that the extrapolating point adjustment mode can be recognized at a glance, resulting in a shorter adjusting time.

Figure 7:
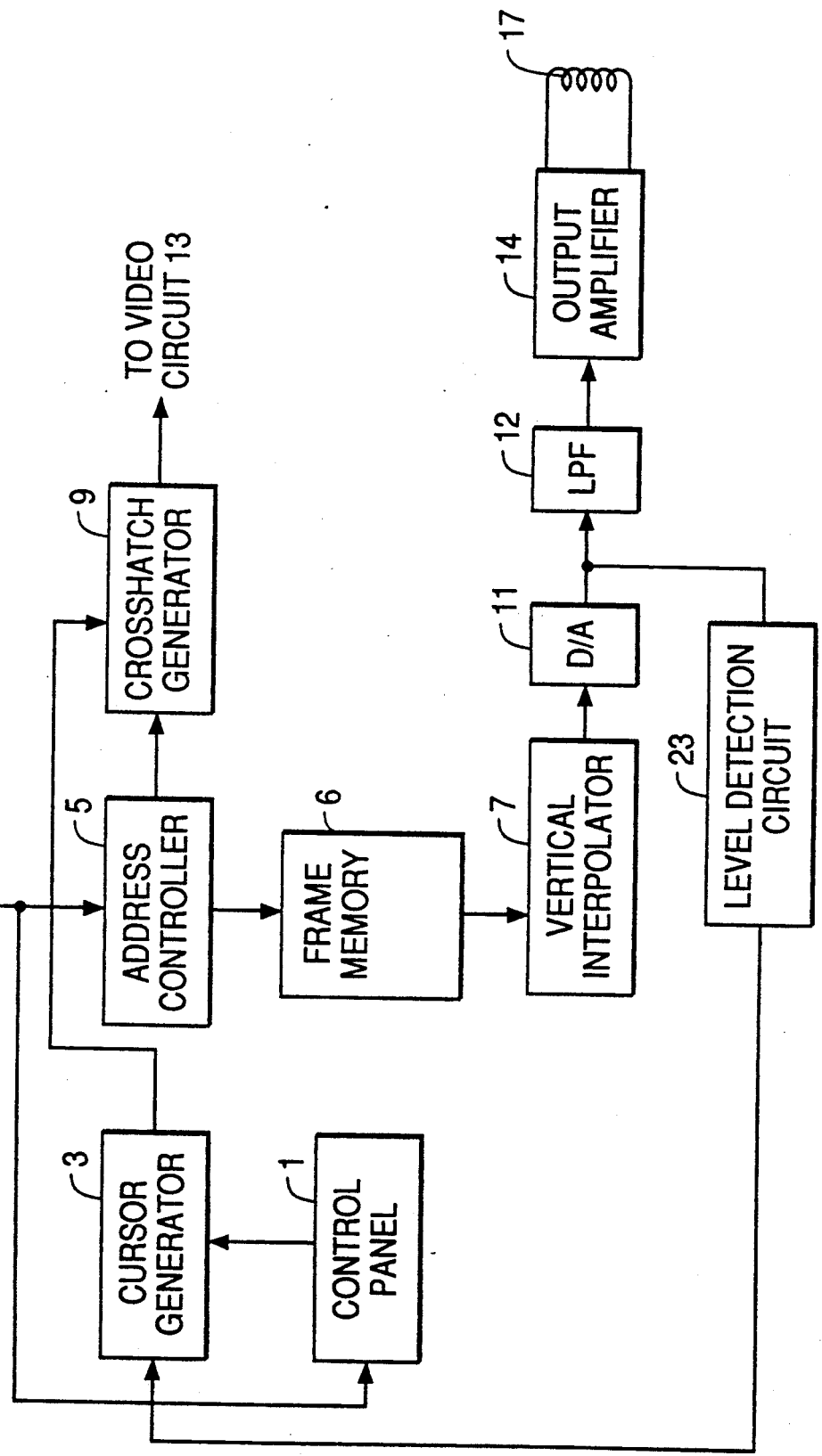
FIG. 7 is a block diagram of a digital convergence apparatus in accordance with second embodiment of the present invention.

FIGS. 7 and 8(a)-8(c) show a second embodiment according to the present invention. The point different in arrangement from the first embodiment is that the cursor display is performed at the screen position corresponding to the correction quantity of the number of quantized bits of a memory. In FIG. 7, element 23 is a level detection circuit for detecting the maximum value and the minimum value of the correction quantity converted into analog signal by a D/A conversion circuit 11, and element 24 is a cursor generator for controlling the range of cursor display area using said detection signal. In FIG. 7, the components operating in a similar manner to those of the first embodiment are shown with the same numerals and an explanation thereof has been omitted.

Figure 8A:
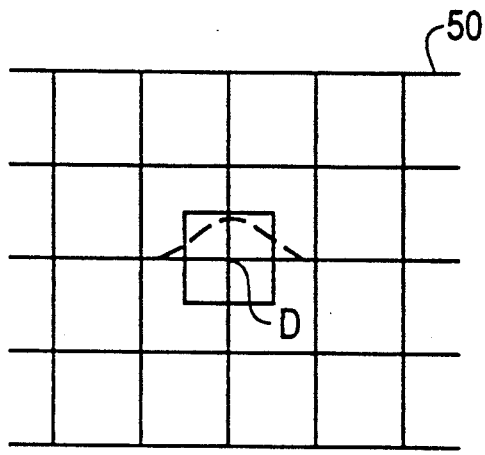
FIGS. 8(a)–8(c) are a display screen view to explain the cursor display of the embodiment of FIG. 7.
Figure 8B:
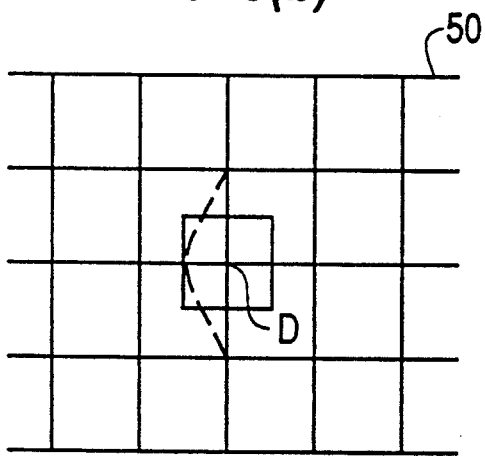
Figure 8C:
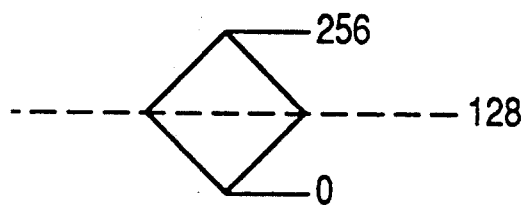

With reference to the display screen view and the correction data view of FIGS. 8(a)-8(c) a digital convergence apparatus according to the present invention will be explained in detail FIG. 8 (a) is a screen view showing a case where the convergence correction in the vertical direction at the adjusting point D is performed, and the position of the crosshatch signal 50 when the broken line at the adjusting point D is corrected is shown. In FIG. 8 (a), when the maximum correction quantity can be corrected in the vertical direction, the cursor display is set such that the maximum value of the correction data from the D/A conversion circuit 11 is detected by the level detection circuit 23, whose detection signal is supplied to the cursor generation circuit 24, which generates a cursor at the screen position corresponding to the maximum correction quantity in the vertical direction. Accordingly, as shown in FIG. 8 (a), a square cursor is displayed within the area corresponding to the position of the maximum correction quantity. Similarly, also when the convergence correction in the horizontal direction is performed as shown in FIG. 8 (b), the cursor display is set such that the maximum value of the correction data from the D/A conversion circuit 11 is detected by the level detection circuit 23, whose detection signal is supplied to the cursor generation circuit 24, which generates a cursor at the screen position corresponding to the maximum correction quantity. Accordingly, as shown in FIG. 8 (b), a square cursor is displayed within the area corresponding to the position of the maximum correction quantity in the horizontal direction. This means that the range which can be corrected is recognized at a glance on the screen, so that it is unnecessary to readjust the correction data which has overflowed.

The detection signal for detecting a level will be explained in detail hereinafter. The maximum correction quantity on the display screen is determined by both the number of quantized bits of a memory and the amplification quantity after being converted to an analog signal. Accordingly, as a detection signal for detecting a level, when a 8-bit memory is used as shown in FIG. 8 (c), signals from the correction data 0 to 256 with the correction data being as a center are projected temporarily as signal for detection on the screen, in which condition the range of the cursor display area is determined. The detection signal is set so as to be outputted during vertical blanking period or initial adjustment. The detection of the level of analog signals from the D/A conversion circuit 13 is due to the fact that the D/A step can substitute for the following step's output amplifier 16 because the gain of the amplifier is constant. Accordingly, the cursor display can be used by displaying the range of convergence correction, other than the discrimination of the positions of the adjusting points.

According to the present embodiment as described above, by displaying the area of cursor display at the screen position corresponding to the correction quantity from the maximum value to the minimum value of the number of quantized bits of a memory based on adjusting point, the correction range being a dynamic range, together with the discrimination of the position of adjusting point, can be displayed on the screen, resulting in a shorter adjusting time. Also, the convergence accuracy between adjusting points can be confirmed, making possible the correction with a high accuracy.

Figure 9:
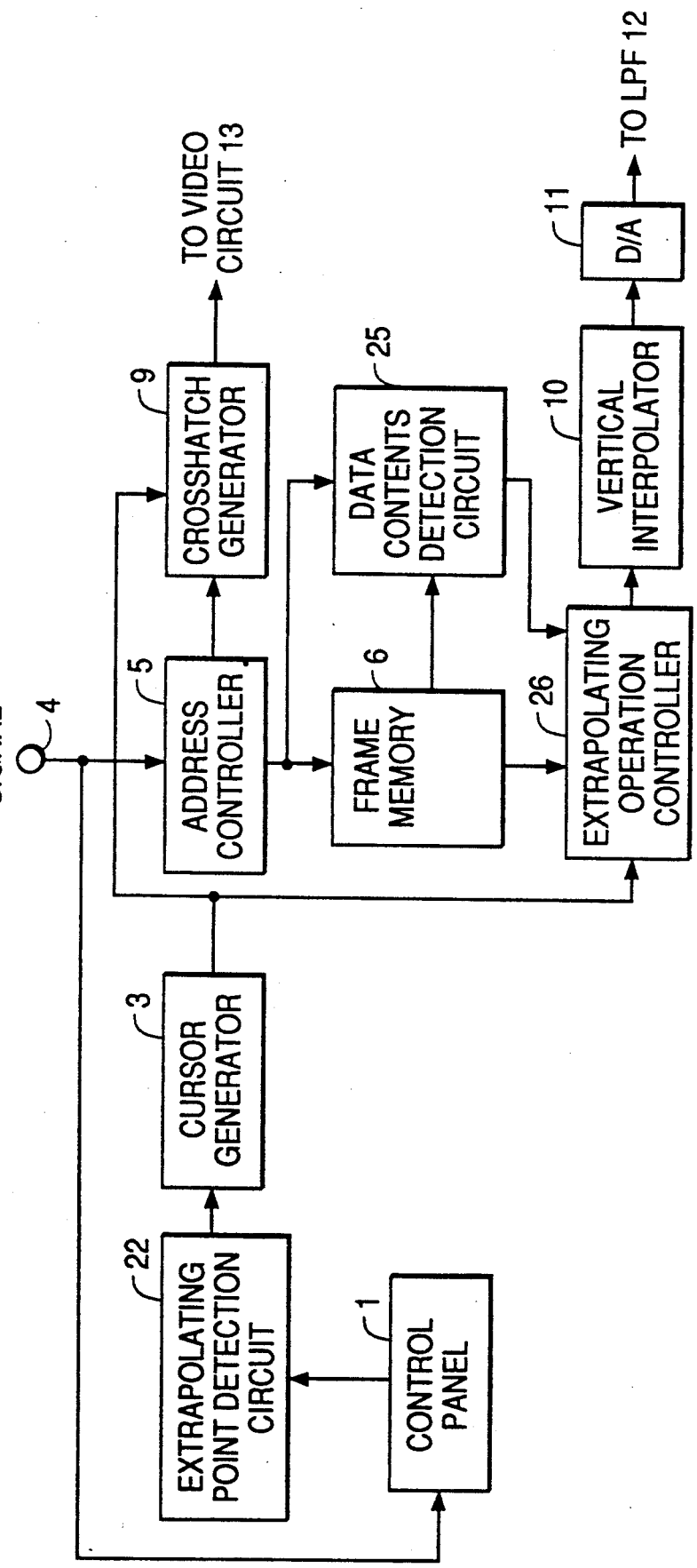
FIG. 9 is a block diagram of a digital convergence apparatus in accordance with a third embodiment of the invention.

FIGS. 9 through 11(c) show a third embodiment according to the present invention. The point different in arrangement from the first embodiment is that the correction data of memory means is to be detected to control the presence/absence of extrapolating operation. In FIG. 9, element 25 is a data contents detection circuit for detecting the data contents of a frame memory 6; element 22 is an extrapolating point detection circuit for detecting the position of extrapolating points by the control signal from a control panel 1, and element 26 is an extrapolating operation controller for controlling the presence/absence of extrapolating operation by the detection signal from said data contents detection circuit 25. In FIG. 9, the components operating in a similar manner to those of the first embodiment are shown with the same numerals and an explanation thereof has been omitted.

Figure 10A:
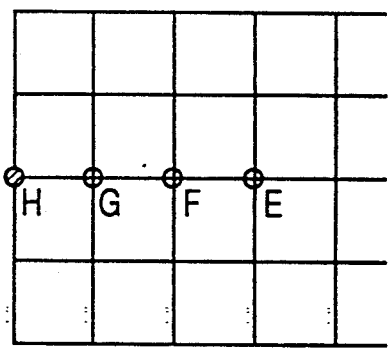
FIGS. 10(a)–10(c) are a display screen views and a correction data graph to explain the operation of the extrapolating operation of the embodiment of FIG. 9.
Figure 10B:
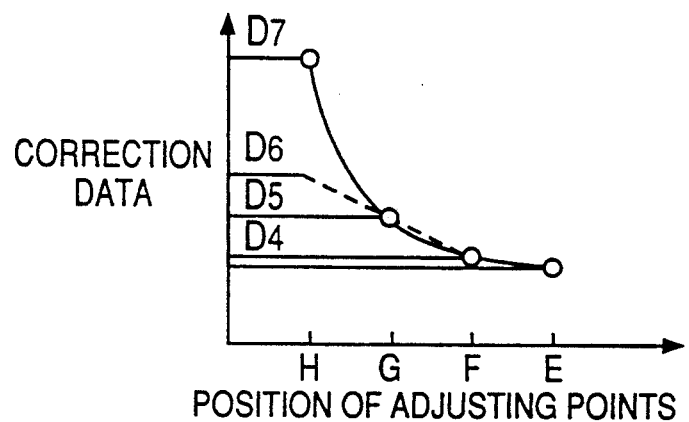
Figure 10C:
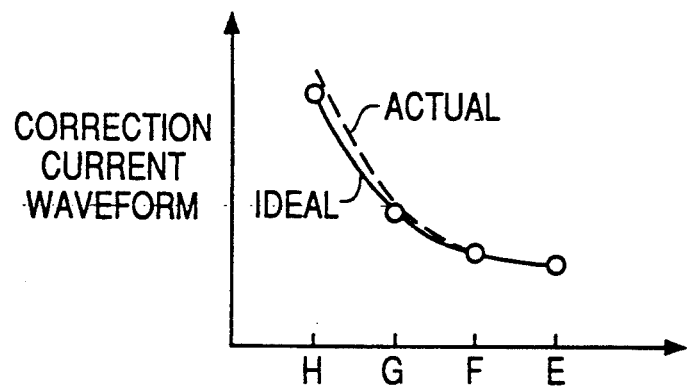

With reference to the display screen view and the correction data graphs of FIGS. 10(b)-10(c), a digital convergence apparatus of the present embodiment will be explained in detail. FIG. 10 (a) shows the display screen view, and FIGS. 10 (b) and 10 (c) show the correction data graphs. The data contents detection circuit 25, which is designed to detect the data contents of the frame memory 6, detects a non-correction condition being an initial mode, for example, memory contents 128, for example, by comparing the data at the CPU. Accordingly, during initial adjustment, when data is inputted into each adjusting point on the display screen of FIG. 10 (a) such that the data D4 is inputted into the adjusting point F, and the data D5 into the adjusting point G as shown in FIG. 10 (b), the data D6 at the extrapolating point H is determined through straight-line approximation by the extrapolating operation controller, and the contents of the correction data of each adjusting point are stored to the frame memory 6. Then, the contents from the frame memory 6 is again detected by the data contents detection circuit 25, which detects whether or not the contents of the correction data is 128. Since the correction data previously adjusted is stored to one-frame memory, a initial mode is determined to not be data other than 128. Thus, the operation of the extrapolating operation controller 26 is set to a mode in which each adjusting point including an extrapolating point can be independently corrected. Accordingly, by only using a straight-line approximation, misconvergence may occur at the extrapolating point of FIG. 10 (b), so that additional data D7 is inputted to perform convergence correction. As shown in FIG. 10 (c) where the low-pass filter (LPF) for smoothing the correction data in the horizontal direction and the output amplifier indicate the correction current waveforms in ideal and actual conditions, each adjusting point cannot be independently corrected in an actual condition because of a band limitation. This means that, even when the correction data of the extrapolating point H is finally written, the point H is affected by adjacent adjusting lines G and F, so that the convergence cannot be coincident unless the adjusting points F, G and H are adjusted several times. Owing to the above reasons, whether the mode is an initial adjustment mode or a fine adjustment mode is determined by the memory contents to set the extrapolating operation to the presence condition for the initial adjustment mode, and to the absence condition for the fine adjustment mode.

Figure 11A:
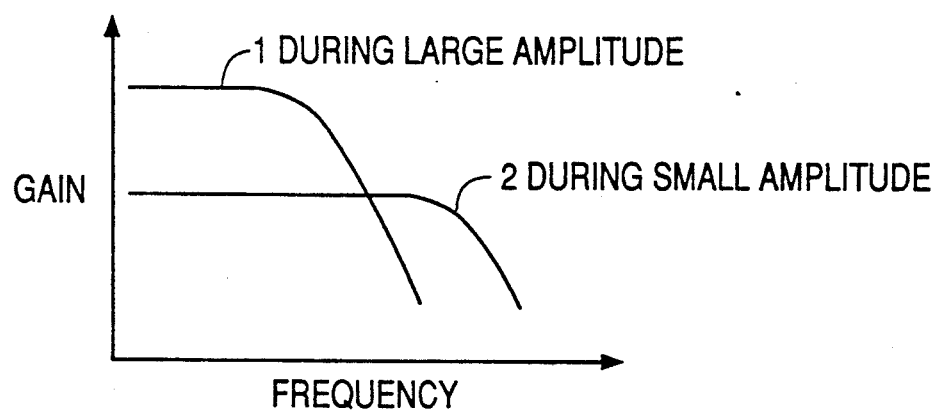
FIGS. 11(a)–11(c) are a frequency characteristic graph and waveform charts to explain the embodiment of FIG. 9.
Figure 11B:
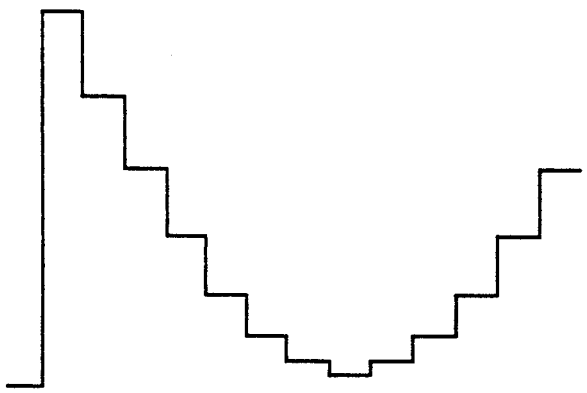
Figure 11C:
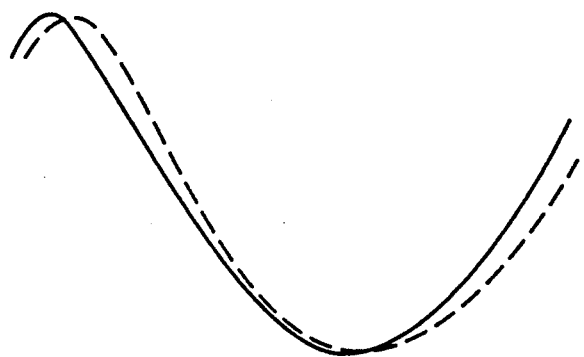

With reference to the characteristic graph and the waveform chart of FIG. 11(a)–11(c), the reason for controlling the extrapolating operation is explained in detail hereinafter. The correction data is smoothed in such manner that in the vertical direction the data corresponding to each scanning line is smoothed by the vertical interpolator 10, while in the horizontal direction the data is smoothed by the band limitation in the LPF 12 and the output amplifier shown in FIG. 7. FIG. 11 (a) shows the frequency characteristic at the output amplifier 16, where the cut-off frequency varies with gain. This means that the band width near the extrapolating point becomes narrow for the screen periphery having a large correction current, so that it is affected by the area between adjacent adjusting points at the screen periphery. For example, when an analog waveform is outputted from the D/A conversion circuit 11 shown in FIG. 11 (b), the correction current waveform flowing through the convergence yoke 17 becomes the one shown in FIG. 11 (c). The current waveform for the case where an ideal band width exists is shown by a continuous line and can be corrected by adjusting points independently, while the current waveform for the case where an actual band width is narrower than the ideal one is shown by a broken line and cannot be corrected by adjusting points independently with its phase delayed. Although the latter condition can be practically solved by increasing the inductance value of the convergence yoke or the supply voltage of the output amplifier, a problem arises that the power consumption of the output amplifier becomes larger. Owing to the above reasons, in order to reduce the adjusting time even for narrower band width, whether the mode is an initial adjustment mode or a fine adjustment mode is determined by the memory contents to set e extrapolating operation to the presence condition for the initial adjustment mode, and to the absence condition for the fine adjustment mode.

According to the present embodiment as described above, by detecting the correction data of memory means to control the presence/absence of extrapolating operation, adjusting time can be extensively shortened. Further, by performing the extrapolating operation only for the initial adjustment, in particular, the effect on the area between adjusting points near the extrapolating point is kept to a minimum, making possible the correction with a high accuracy.

Figure 12:
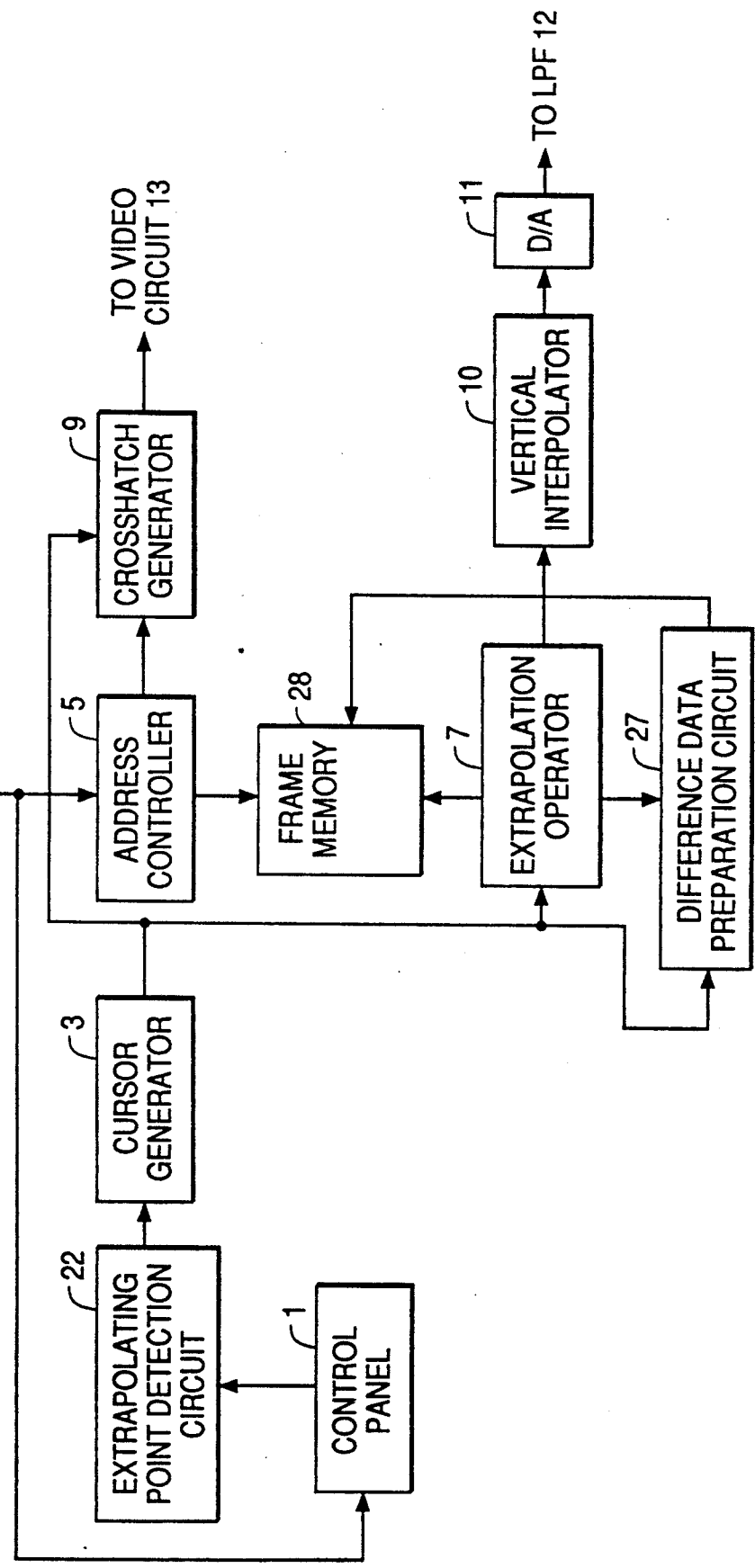
FIG. 12 is a block diagram of a digital convergence apparatus in accordance with a fourth embodiment of the present invention.

FIGS. 12 and 13(a)–13(c) show a fourth embodiment according to the present invention. The point different in arrangement from the first embodiment is that, by storing only the difference data to the correction data determined by extrapolating operation, the correction data of the extrapolating point outside the screen is designed to be obtained from the said extrapolating operation data and the difference data. In FIG. 12, element 27 is a difference data preparation circuit for preparing the difference data between the data determined by extrapolating operation and the correction data actually adjusted, and element 28 is a frame memory for storing the difference data of said extrapolating point. In FIG. 12 the components operating in a similar manner to those of the first embodiment are shown with the same numerals and an explanation thereof has been omitted.

Figure 13A:
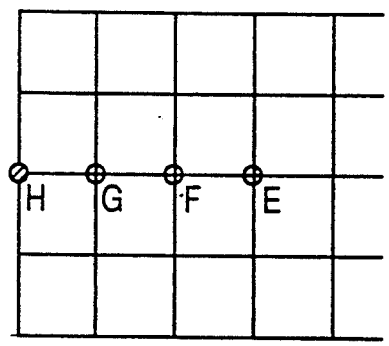
FIGS. 13(a)–13(c) are a display screen view and correction data graphs to explain the operation of the extrapolating operation of the embodiment of FIG. 12.
Figure 13B:
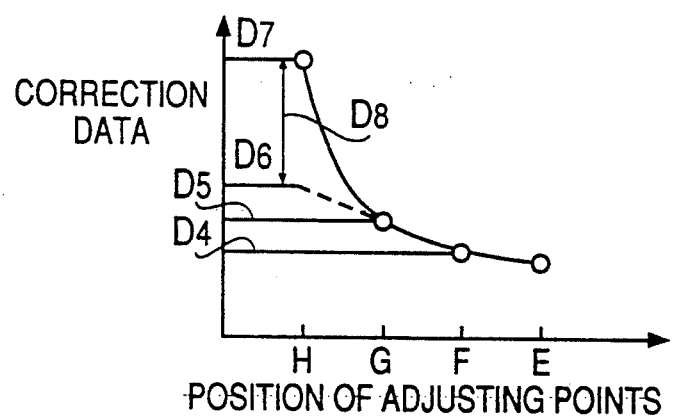
Figure 13C:
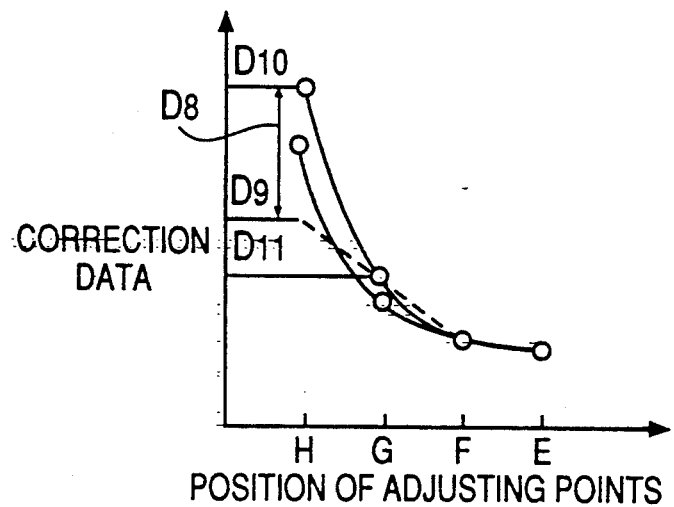

With reference to the display screen view and the correction data graph of FIG. 13(b)–13(c), a digital convergence apparatus according to the present invention will be explained in detail. Using the display screen view shown in FIG. 13(a), the cases for the adjusting points E, F and G within the screen, and for the extrapolating point H of the adjusting points outside the screen will be explained. FIG. 13 (b) shows the correction data graph indicating the correction data of each adjusting point, where, when data D4 is inputted into the adjusting point F and data D5 into the adjusting point G as correction data, data D6 at the extrapolating point H is determined through straight-line approximative operation using the data from said adjusting points by use of the extrapolating operator 7. However, the convergence correction with a high accuracy cannot be performed by only 9 straight-line approximative operation, so that actually the adjustment is finished with the data changed from D6 to D7. At this time, the difference data between the data D6 determined from the extrapolating operation and the actual data D7 is detected by the difference data preparation circuit 27. The difference data is stored in the frame memory 228 at the address corresponding to the extrapolating point. Then, the reading of the correction data from the frame memory 228 is performed such that, for the adjusting points within the screen, the stored correction data is read as usual, while for the extrapolating points, the data which is the total of the correction data determined by extrapolating operation and the correction data stored in the frame memory 28 is outputted. FIG. 13 (c) shows the change of the correction data of the extrapolating point when the correction data of the adjusting point G is allowed to be changed. The extrapolating operator 7 outputs the data which is the resultant obtained by adding the data D9 determined through extrapolating operation from the data D4 at the adjusting point F and the data D11 at the adjusting point G to the difference data D8. Accordingly, the extrapolating point stores only the difference data to provide the correction data, so that, even when the correction data of the adjusting point adjacent to the extrapolating point within the screen is allowed to be changed, significantly correlated correction data can be prepared as shown in FIG. 13 (c).

According to the present embodiment as described above, the correction data stores only the difference data to the correction data determined by extrapolating operation, and the correction data of the extrapolating point is determined by said extrapolating operation data and the difference data, whereby, even when the data of the adjusting point within the screen determined by extrapolating operation is allowed to be changed, correlated correction data can be prepared, allowing adjusting time to be shortened without readjusting the extrapolating point. Further, the correction data of the extrapolating point having a large correction quantity is only the difference data, allowing the number of quantized bits of a memory and the size of circuit to be reduced.

Figure 14:
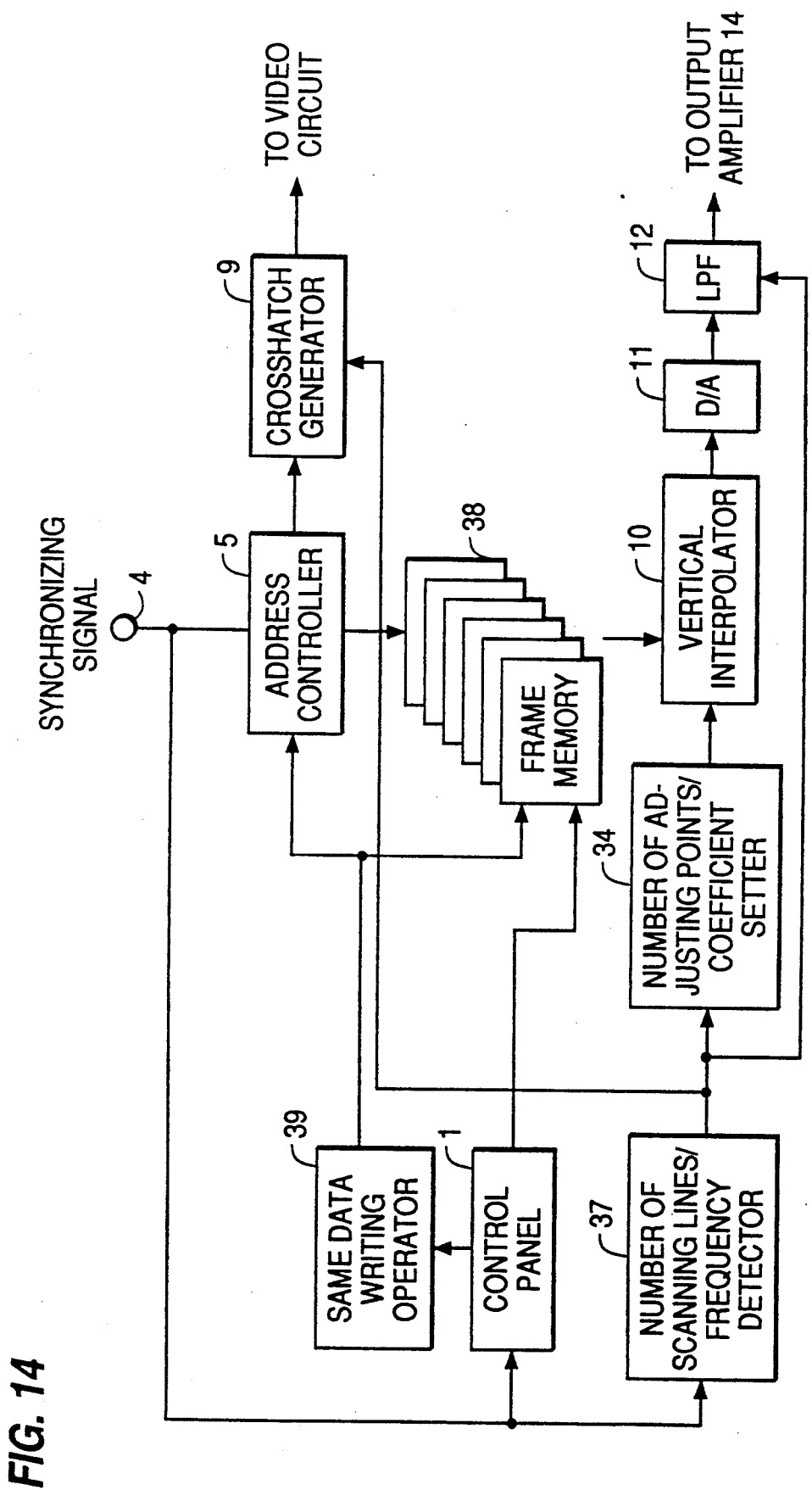
FIG. 14 is a block diagram of a digital convergence apparatus in accordance with a fifth embodiment of the present invention.

FIGS. 14 to 17 show a fifth embodiment according to the present invention. The point different in arrangement from the first embodiment is that the same correction data is designed to be written simultaneously into n-piece memory means. In FIG. 14, element 39 is a same data writing operator for writing the same correction data into a n-piece frame 38; element 38 is a frame memory which consists of n-pieces of memory planes, and element 37 is a number of scanning lines/frequency detector for detecting the number of scanning lines and frequency from synchronizing signals. In FIG. 14, the components operating in a similar manner to those of the first embodiment are shown with the same numerals and an explanation thereof has been omitted.

Figure 15:
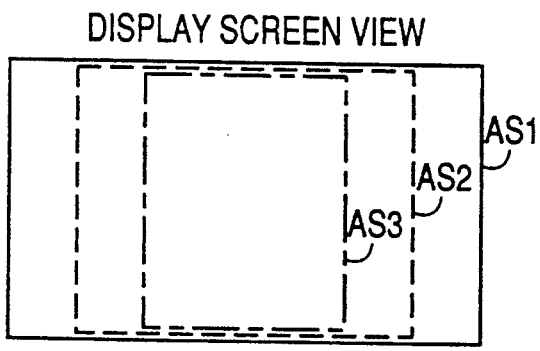
FIG. 15 is a display screen view to explain the embodiment of FIG. 14.
Figure 16:
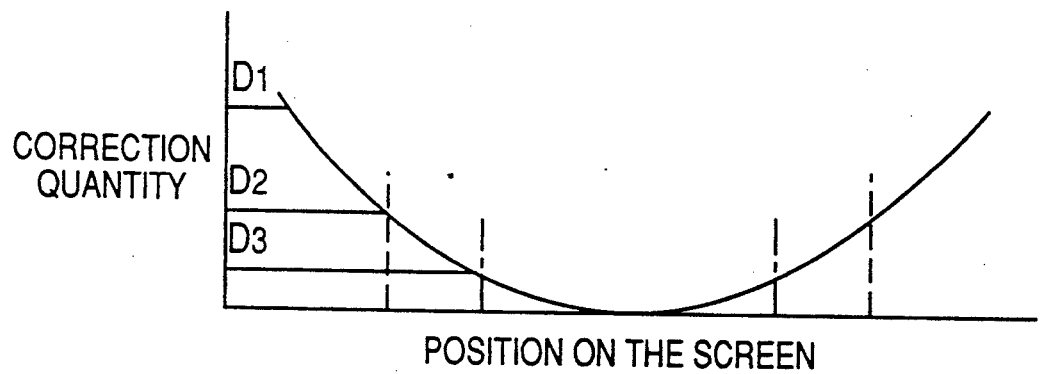
FIG. 16 is an operational representation of the embodiment of FIG. 14.
Figure 17:
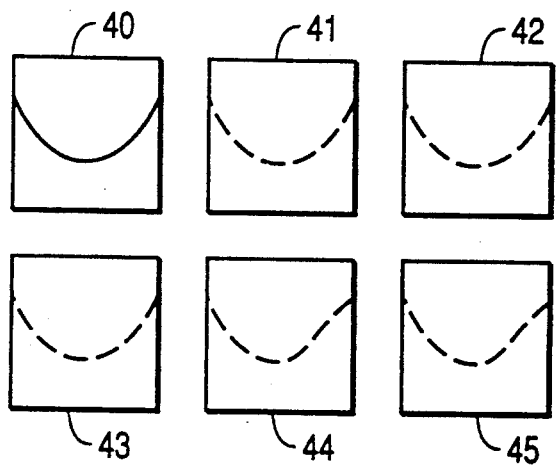
FIG. 17 is a correction data graph of each memory of the embodiment of FIG. 14.

Using the display screen view of FIG. 15, the correction data graph of FIG. 16, and the memory layout view of FIG. 17, a digital convergence apparatus of the present invention is explained in detail as follows. In order to accommodate various aspects as shown in the display screen view of FIG. 15, a plurality of memory planes as well as the writing or adjustment of the correction data for each memory plane are required. Where the correction data of the aspect AS1 (continuous line) of FIG. 15 is shown in FIG. 16, it suffices for the aspect AS2 (broken line) of FIG. 15 that the correction quantity of FIG. 16 is D2, and for the aspect AS3 (alternate long and short dashes line) of FIG. 15 that the correction quantity of FIG. 16 is D3. After the correction data shown in FIG. 16 has been allowed to be inputted into the selected memory 40 of FIG. 17, the correction data selected by controlling the address controller 5 and the frame memory 38 is written by use of the same data writing operator 39 into the remaining memories 41 through 45. This operation is performed such that, with a key for writing the same data provided on the control panel, the key operation is determined by the same data writing operator 39, then using the operation signal the selection of memory address is performed by the address controller 5, and the correction data is written into the memory area which has not been written into the frame memory 38. Thus, the correction data (continuous line) is written into the memory 40 of FIG. 17, and the correction data (broken line) into the remaining memories 41 through 45. This operation is performed by use of, for example, a CPU.

The operation will be explained hereinafter. The operation of the control panel 1, the same data writing operator 39, the number of scanning lines/frequency detector 37, and the number of adjusting points/coefficient setter 34 shown in FIG. 14 can be performed by CPU processing. The key discrimination of the control panel 1, the address control/data transfer of the same data writing operator 39, and the operation processing of the scanning line/frequency detector described in said first embodiment and the number of scanning lines/frequency detector 37 are also possible. Those processings are performed during a vertical blanking period, so that no interference arises on the screen.

According to the present embodiment, simultaneous writing of the same correction data into an n-piece memory means requires only one input of the correction data into the n-piece memory means, that is, only one adjustment, so that adjusting time can be shortened. Also, fine adjustment requires less changes in the quantity of the correction data, allowing the adjustment to be extensively shortened.

Figure 19:
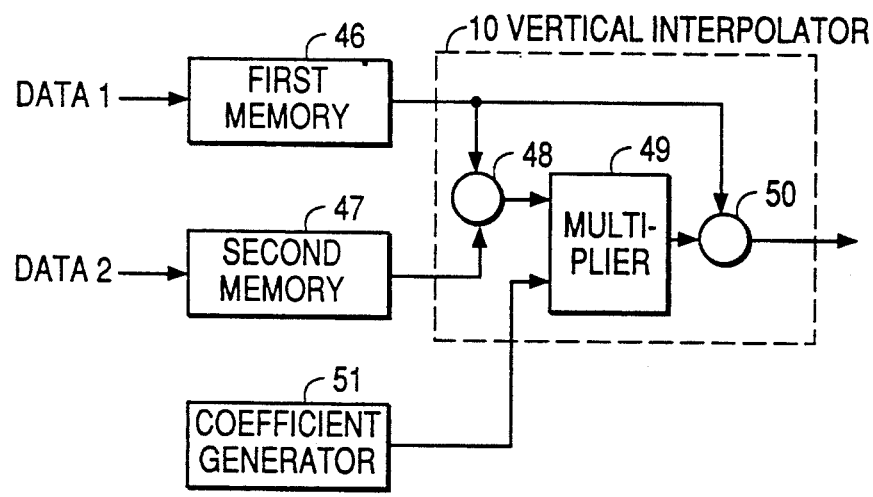
FIG. 19 is a block diagram of vertical interpolation means of the embodiment of FIG. 18.
Figure 20:
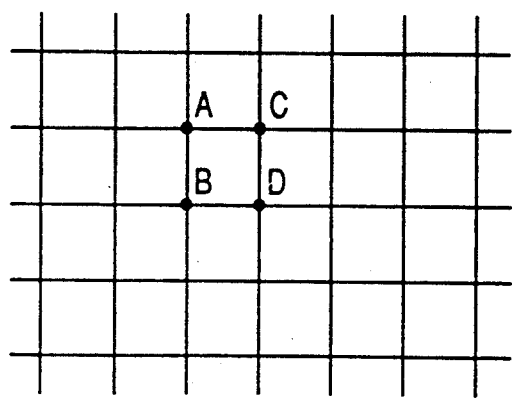
FIG. 20 is a display screen view to explain the embodiment of FIG. 18.
Figure 18:
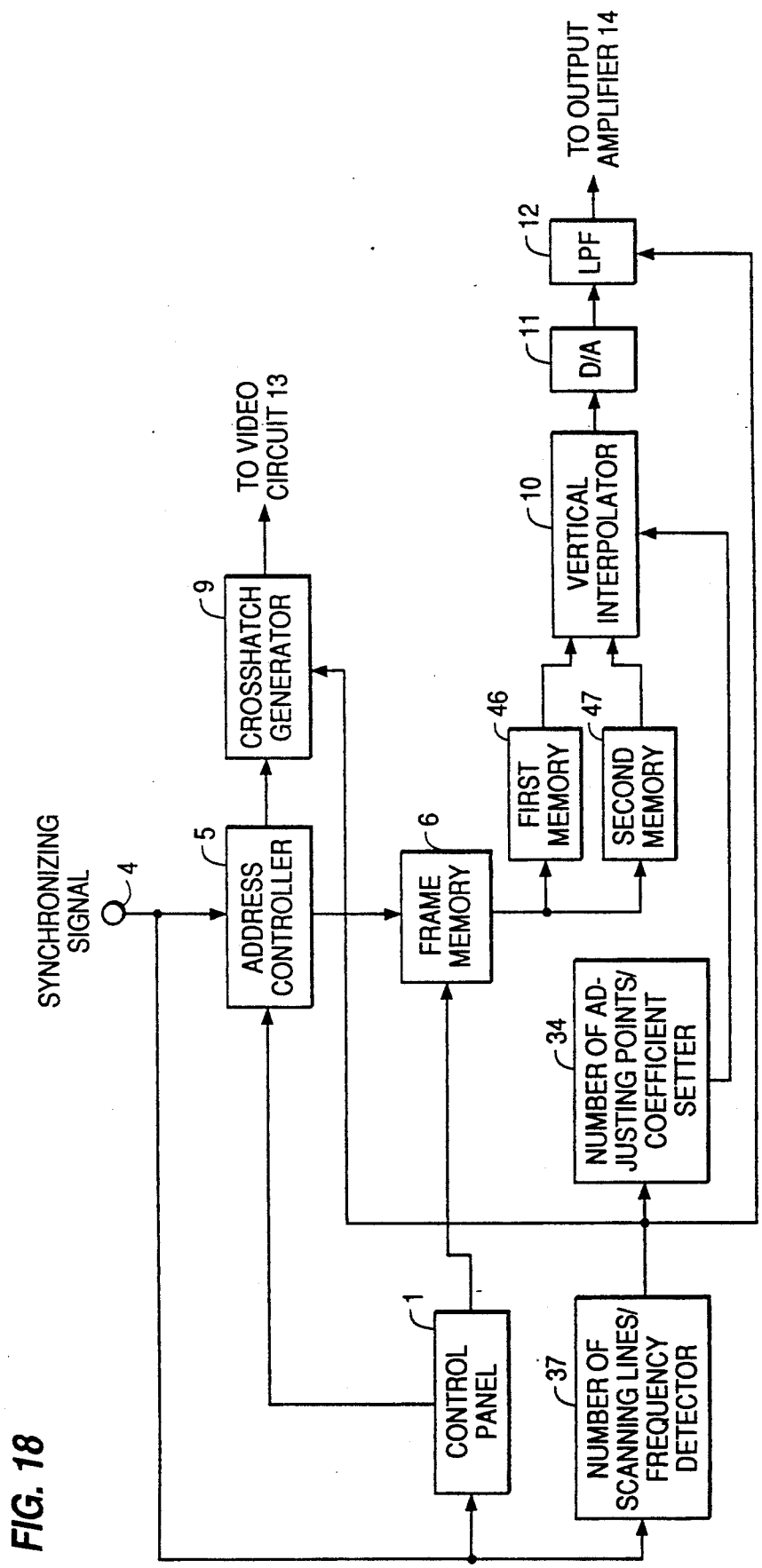
FIG. 18 is a block diagram of a digital convergence apparatus in accordance with a sixth embodiment of the present invention.

FIGS. 18 to 20 show a sixth embodiment according to the present invention. The point different in arrangement from the first embodiment is that a time serial processing for performing the interpolation between adjusting points in the vertical direction is designed to be performed using two memories. In FIG. 18, a first-/second memories 10 for performing the interpolation between adjusting points in the vertical direction is vertical interpolators for performing the interpolation between adjusting points in the vertical direction. In FIG. 18, the components operating in a similar manner to those of the first embodiment are shown with the same numerals and an explanation thereof has been omitted.

With reference to the block diagram of FIG. 19 and the display screen view of FIG. 20, a digital convergence apparatus of the present invention is explained in as follows. The correction data of the adjusting point A of the display screen view of FIG. 11 from the frame memory 6 is stored in the first memory 46, and the correction data of the adjusting point B of the same view in the second memory 47. The correction data of the adjusting points in the vertical direction from the first and second memories 46 and 47 is supplied to a vertical direction operator 10, where the correction data corresponding to each scanning line between adjusting points is determined by the operation data from the number of adjusting points/coefficient setter 34. Since the following operations are similar to those for the first embodiment, their explanation has been omitted. By performing interpolation through the time serial processing as described above the, operation rate is reduced, making it possible for the arrangement to accommodate signal sources having a high horizontal scanning frequency.

Using the block diagram of FIG. 19 the interpolation in the vertical direction is explained in detail hereinafter. The correction quantity of each scanning line between A and B or C and D can also be determined by the equation $(A-B)+K+A$. For the K in this case, the value determined by straight-line approximation is written into a coefficient generator 51. From the frame memory 6 using the address controller 5 of FIG. 18, the correction data of the adjusting point C of FIG. 20 for the data 1 of FIG. 19 is inputted, and the correction data of the adjusting point D of FIG. 20 for the data 2 is inputted into the first and second memories 46 and 47, respectively, to store each correction data. The data from the first and second memories 46 and 47 is processed for $(A-B)$ operation by a subtracter 48, inputted into a multiplier 49 where it is multiplied by the coefficient for each scanning line from the coefficient generator 51 to determine (A−B) K, and the resultant is inputted into an adder 50 which calculates (A−B) K+A and outputs it. The above operation means that the interpolation between adjusting points C and D has been performed.

Similarly to the arrangement described in first embodiment, the number of scanning lines/frequency is detected to control the interpolation between adjusting points in the vertical direction and the cut-off frequency of address/LPF, making it possible to accommodate various signal sources.

According to the present embodiment as described above, by performing the time serial processing to perform the interpolation between adjusting points in the vertical direction using two memories, the operation rate is reduced, making it possible to accommodate signal sources having a high horizontal scanning frequency, and to expand the accommodation range.

What is claimed is:

1. A digital convergence apparatus comprising:
    an adjusting point generating means for generating a plurality of convergence adjusting points in horizontal and vertical directions on a screen of a color television receiver;
    a digital memory means for storing convergence correction data for said adjusting points;
    a cursor generating means for generating a cursor on said screen, including a means for generating a cursor indicating an adjusting point outside said screen at an adjusting point on said screen;
    a detecting means for detecting a presence/absence of a synchronizing signal inputted into said receiver, a frequency of said synchronizing signal and the number of scanning lines, and for generating a detection signal indicative of the detected presence/absence, frequency and number of scanning lines; and
    a correction data generated means for generating a convergence correction data from the convergence correction data stored in said digital memory means, including: an interpolating means for performing interpolation between adjacent adjusting points according to said detection signal; and an extrapolating means for determining a convergence correction data for each adjusting point outside said screen by extrapolating operation from convergence correction data for the adjusting points on said screen.

2. A digital convergence apparatus as described in claim 1, wherein said extrapolated means extrapolates convergence correction data for two adjacent adjusting points on said screen to obtain a convergence correction data for an adjusting point outside said screen, and said means for generating a cursor for an adjusting point outside said screen generates two cursors at said two adjacent adjusting points on said screen, respectively.

3. A digital convergence apparatus as described in claim 1, wherein said interpolating means comprises a vertical interpolating means for performing an interpolating operation in a vertical direction according to a detected number of scanning lines, and a horizontal interpolating means for performing an interpolating operation in a horizontal direction according to a detected frequency of the synchronizing signal.

4. A digital convergence apparatus as described in claim 3, wherein said horizontal interpolating means comprises a low-pass filter whose cut-off frequency is controlled by the detected frequency of the synchronizing signal.

5. A digital convergence apparatus as described in claim 1, wherein said interpolating means is responsive to a detection signal indicating an absence of the synchronizing signal for generating predetermined specific convergence corrections data.

* * * * *